United States Patent [19]

Wakao et al.

[11] 4,420,888
[45] Dec. 20, 1983

[54] DIAL GAUGE

[75] Inventors: Masato Wakao; Iwao Sugizaki, both of Kawasaki, Japan

[73] Assignee: Mitutoyo Mfg. Co., Ltd., Tokyo, Japan

[21] Appl. No.: 385,243

[22] Filed: Jun. 4, 1982

[30] Foreign Application Priority Data

Jun. 23, 1981 [JP] Japan .................................. 56-97226

[51] Int. Cl.³ .............................................. G01B 3/22
[52] U.S. Cl. .................................................. 33/172 R
[58] Field of Search ....................................... 33/172 R

[56] References Cited

U.S. PATENT DOCUMENTS 1,151,635  8/1915  Webb ................................. 33/172 R
2,077,123  4/1937  Mahr .................................. 33/172 R

FOREIGN PATENT DOCUMENTS 947964   1/1949  France ............................. 33/172 R
253983  12/1948  Switzerland ..................... 33/172 R Primary Examiner—Harry N. Haroian
Attorney, Agent, or Firm—Flynn, Thiel, Boutell & Tanis

[57] ABSTRACT

A dial gauge wherein a mechanism for imparting a displacement of a spindle is simplified in arrangement.

In this dial gauge, a link is rotated by a driving piece secured to the spindle, and a rotational value of this link is imparted to a cam member connected to a hand through a reciprocating member, so that the displacement of the spindle can be indicated.

4 Claims, 3 Drawing Figures

DIAL GAUGE

BACKGROUND OF THE INVENTION

1. Field of the Invention

This invention relates to dial gauges, and more particularly to improvements in construction for imparting displacement of a measuring element at the forward end of a spindle to an indicating hand.

2. Description of the Prior Art

Heretofore, there have been used dial gauges wherein a very fine movement of the measuring element is enlarged by a gearing, a workpiece and a block gauge or a reference length is compared and measured to read a difference in dimensions, whereby a deviation is obtained.

The conventional dial gauge has been constructed such that a spindle is provided at a substantially central portion of a cylindrical casing body having a bottom, in a manner to penetrate through the casing body in the radial direction thereof, a displacement of this spindle in the radial direction of the casing body is imparted by a rack portion formed on the spindle to a pinion, and further, a rotation of this pinion is enlarged by an enlarging mechanism and imparted to an indicating hand.

However, the conventional dial gauge of the type described has been disadvantageous in that a backlash compensating mechanism must be provided to prevent a dispersion in measured value from occurring, and difficulties are encountered in assembling thereof because of the penetration of the spindle through the casing body. Further, the conventional dial gauge has presented such various disadvantages that the number of parts is large as a whole and the parts need high accuracy of finishing, whereby a large number of working hours is required, costs of parts are high, and difficulties are encountered in adjustment during assembling work, which requires a high skill level.

SUMMARY OF THE INVENTION

The present invention has as its object the provision of an inexpensive dial gauge being simplified in construction, facilitated in assembling and having high accuracy.

To achieve the above-described object, the present invention contemplates that a movement of a spindle provided on a casing body in a manner to be axially displaceable is imparted to a link mechanism through a driving piece secured to the spindle, the movement of the driving piece is enlarged by this link mechanism, and transmitted to a reciprocating member, and further, the movement of this reciprocating member is imparted to an indicating hand, whereby the need for parts to be finished with high accuracy, such as gears and a rack, is eliminated and construction is simplified.

DETAILED DESCRIPTION OF THE PREFERRED EMBODIMENT

Description will hereunder be given of the embodiment of the dial gauge according to the present invention with reference to the accompanying drawings.

Figure 1:
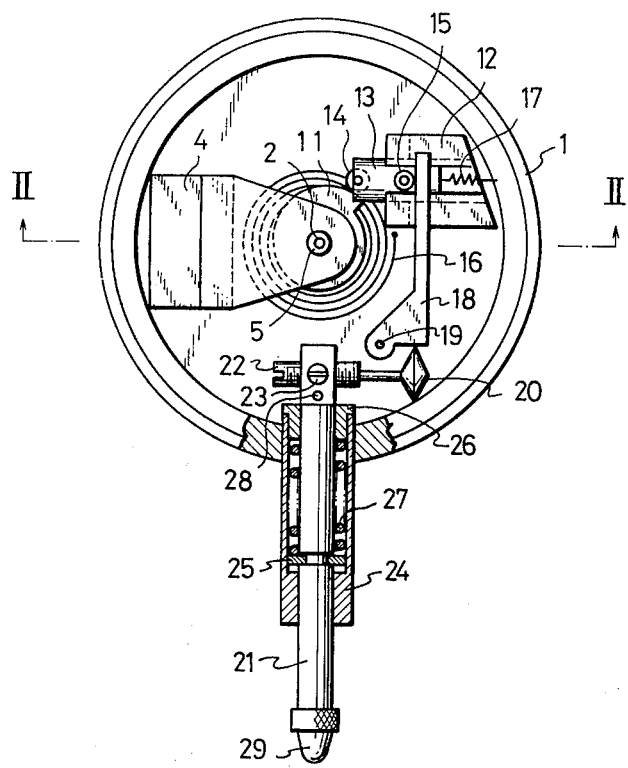
FIG. 1 is a front view, partly broken away, showing an embodiment of the dial gauge according to the present invention, with a cover being removed.
Figure 2:
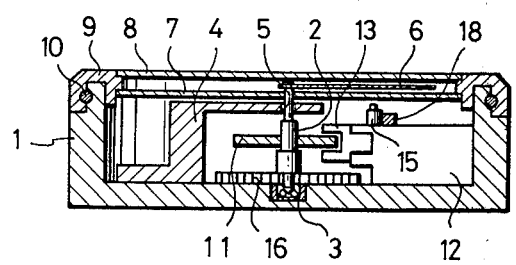
FIG. 2 is a sectional view taken along the line II—II in FIG. 1.

In FIGS. 1 and 2, a rotary shaft 2 is provided at the substantially central portion of a casing body 1 formed of a cylindrical member having a closed bottom. The rotary shaft 2 is rotatably supported at one end thereof by a pivot bearing 3 and at the forward end portion thereof by a bearing portion 5 of a fixed block 4. The fixed block 4 is in the form of a substantially Z shape in side plan view, and fixed at one portion thereof to the bottom of the casing body 1. Secured to the forward end portion of the rotary shaft 2 is an indicator hand 6. Opposed to the rear face of this hand 6 (the under surface in FIG. 2) is a dial plate 7 and opposed to the outer face of the hand 6 (the upper surface in FIG. 2) is a transparent plate 8 formed of an acrylic plate or a glass plate. The dial plate 7 and the transparent plate 8 are secured to a ring-shaped cover 9, and the casing body 1 is closed by this cover 9. An O-ring 10 is confined in a coupling portion between this cover 9 and the casing body 1.

Figure 3:
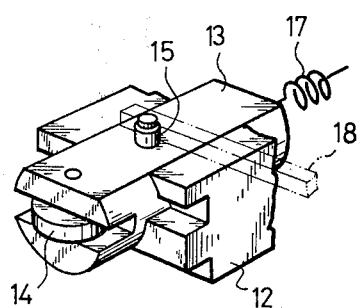
FIG. 3 is an enlarged perspective view showing the essential portions of the slider portion in FIG. 1.

A substantially involute cam member 11 is solidly secured about the central portion of the rotary shaft 2, and abutted against the outer peripheral surface of this cam member 11 is a miniature bearing 14, as being a revolving roller, secured to the forward end portion of a slider 13, as being a reciprocating member, to be slidably guided by a guide block 12 affixed to the casing body 1. One portion of this slider 13 is exposed from the guide block 12, and a collar 15 projects from the portion of the slider 13, exposed from the guide block 12 as shown in FIG. 3. Furthermore, confined between the casing body 1 and the rotary shaft 2 is a spiral spring 16 as being cam member biasing means, whereby the rotary shaft 2, i.e., the cam member 11 is constantly biased in a predetermined direction, in the counterclockwise direction in FIG. 1, or in a direction, in which the larger diameter portion of the cam member 11 is biased to abut against the miniature bearing 14 of the slider 13.

Stretched between the casing body 1 and the base end portion of the slider 13 opposite to a portion thereof secured thereto with the miniature bearing 14 is a tension coil spring 17 having a comparatively weak resiliency as being reciprocating member biasing means. Further abutted against the collar 15 of the slider 13 is the forward end portion of a lever 18 constituting a link mechanism, and the base end of this lever 18 is rotatably supported on the bottom of the casing body 1 through a pivot 19. Abutted against a portion close to the fulcrum of this lever 18 is a contact point adjusting member 20 being of an abacus bead shape as being a driving piece, and this contact point adjusting member 20 is affixed to one end of an adjusting screw 22 screwed into an internal end of a spindle 21 in a manner to be linearly movable in a direction perpendicularly intersecting the axial line of this spindle 21. This adjusting screw 22 is adapted to be fixed by a set screw 23 after being adjusted at a predetermined position. In this case, the position, where the contact point adjusting member 20 abuts against the lever 18, is changed, so that the rate of a rotation of the lever 18 relative to a movement of a predetermined value of the contact point adjusting member 20, i.e., the rate of enlarging a movement of the slider 13 relative to a movement of the spindle 21 can be varied.

The spindle 21 is slidably supported by a stem 24, which is projectingly provided on the cylindrical portion of the casing body 1, so that the spindle 1 is linearly movable in the radial direction of the casing body 1, i.e., the axial direction of the spindle 21. Additionally, a spring receiver 25 is affixed to a portion of the spindle 21 in the stem 24, and a compression coil spring 27 as being spindle biasing means for biasing the spindle 21 in the direction of projection is confined between this spring receiver 25 and a plug member 26 screwed into the internal end of the stem 24. A stop pin 28 penetrating through the spindle 21 in the radial direction thereof is secured to the internal end portion of the spindle 21, and this stop pin 28 regulates the movement value of the spindle 21 in the direction of projection rendered by the compression coil spring 27.

Designated at 29 in FIG. 1 is a measuring element detachably secured to the forward end of the spindle 21. This measuring element 29 is adapted to abut against a workpiece, not shown, and has a suitable configuration in accordance with the shape, material quality and the like of the workpiece.

Description will now be given of action of the present embodiment.

When the measuring element 29 secured to the forward end of the spindle 21 is abutted against the workpiece, whereby the spindle 21 is pushed upwardly in the drawing against the resiliency of the compression coil spring 27, the contact point adjusting member 20 integrally affixed to this spindle 21 through the adjusting screw 22 rotates the lever 18 about the pivot 19. This movement is amplified because the distance between the forward end portion of the lever 18 and the pivot 19 is larger than the distance between the contact point adjusting member 20 and the pivot 19.

Rotation of the lever 18 causes the slider 13 to slide through the collar 15 in the direction of the cam member 11 (to the left in the drawing) against the resiliency of the tension coil spring 17. Since the miniature bearing 14 provided at the forward end portion of the slider 13 is abutted against the circumferential surface of the cam member 11, when the slider 13 is pushed out in the direction of the cam member 11, the cam member 11 is rotated against the resiliency of the spiral spring 16 in a direction of reducing the distance from the outer peripheral surface of the cam member 11 to the center thereof, i.e., in the clockwise direction in FIG. 1. This movement is easily understood when the involute cam member 11 is supposed to be replaced by an inclined cam. More specifically, when the cam member having an inclined abutment surface is urged by the slider abutting thereagainst, the cam member moves to the higher side of inclination due to a component of the urging force of the slider. In the present embodiment, this rectilinear movement is utilized as a rotational movement.

When the cam member 11 is rotated as described above, the rotary shaft 2 and the hand 6 affixed to this rotary shaft 2 are rotated, so that the movement value of the measuring element 29 can be read on the dial plate as a deviation value of the hand 6.

On the other hand, when the spindle 21 is not abutted against the workpiece, the cam member 11 is rotated through the resiliency of the spiral spring 16 in the counterclockwise direction in the drawing, whereby the miniature bearing 14 of the slider 13 is abutted against the substantially highest portion, i.e., the portion having the largest radius of the cam member 11. Furthermore, the collar 15 is abutted against the forward end of the lever 18 through the resiliency of the tension coil spring 17, and the spindle 21 is moved in the direction of projection through the resiliency of the compression coil spring 27.

The present embodiment described above can offer the following effects.

The assembling work is highly facilitated because, in order to effect assembling, it is not necessary that, firstly, a spindle traversing the center position of the casing body 1 is received, and subsequently, the mechanism for enlarging and imparting the displacement of the spindle and the backlash compensating mechanism are additionally received. More specifically, in the present embodiment, since the spindle is not largely projected inwardly into the casing body 1, the workability can be improved when the cam member 11, slider 13, lever 18, adjusting screw 22 and the like are assembled into the casing body 1.

Further, in the dial gauge of the present embodiment, no gear engaged portion is present and the respective connecting points are constantly in point-to-point and line-to-line contacts, whereby no dispersion in measured value due to backlash is seen. In consequence, the need for a backlash compensating mechanism or expensive parts requiring finishing with high accuracy is eliminated, whereby the whole mechanisms are simplified, so that the dial gauge can be produced at a low cost. Furthermore, adjustment of the engaged conditions of the respective parts during assembling work is so simple as to adjust the position of the contact point adjusting member 20 by means of the adjusting screw 22 and the set screw 23, so that the efficiency of the assembling work can be further improved, differing from the case of the conventional dial gauge, where the high skill level has been required for assembling.

Further, in the present embodiment, the rate of enlarging can be desirably selected by changing the position of abutment between the contact point adjusting member 20 and the lever 18 as being the link mechanism like in the conventional dial gauge, without endangering the function of the conventional dial gauge. In this case, the contact point adjusting member 20 is in the form of an abacus bead, so that the adjustment thereof can be effected smoothly, thus enabling to avoid endangering the transmission of movement.

Furthermore, as compared with the conventional dial gauges, the need for the parts such as gears is eliminated, the number of parts as a whole is reduced, and hence, the dial gauge according to the present invention can be produced at a low cost as viewed from this respect.

In addition, in the present embodiment, the miniature bearing 14 provided on the forward end portion of the slider 13 may be replaced by the forward end portion of the slider 13, which is smoothed so as to directly abut against the cam member 11. However, the provision of the miniature bearing 14 as being the revolving roller makes it possible that the abutment with the cam member 11 is more smoothly effected and the durability is improved. Additionally, the spiral spring 16, tension coil spring 17 and compression coil spring 27 as being the biasing means, respectively, should not necessarily be limited to the present constructions and dispositions, but may be replaced by other constructions such as torsional springs, sheet springs or the like and by other dispositions. More specifically, in the above-described embodiment, either the tension coil spring 17 or the compression coil spring 27, particularly the tension coil spring 17, may be dispensed with. Further, the lever 18 constituting the link mechanism, the arrangement of the lever 18 and the contact point adjusting member 20 for varying the rate of enlarging may be replaced by any other arrangement. For example, the present arrangement may be replaced by a plurality of links interconnected and having therebetween a connecting point or points being variable in the positional relationship. In short, it suffices that a movement of the spindle 21 is enlarged and imparted to the slider 13 as being the reciprocating member.

The present invention, having the above-described arrangement in a dial gauge, can offer the advantages of providing a dial gauge simplified in construction and easy in assembling.

What is claimed is:

1. A dial gauge, comprising:
a gauge case body;
an elongated spindle protruding from said body and supported on said body for displacement toward and away from said body, and first biasing means urging said spindle in a direction outwardly from said body;
a shaft rotatably mounted within said body, an indicator hand mounted on one end of said shaft for rotation therewith, a cam member mounted on said shaft and adapted to effect rotation thereof, and second biasing means connected between said shaft and said body for urging said shaft and thereby said cam member and said indicator hand in one predetermined rotational direction;
a reciprocable member supported on said body for reciprocation toward and away from said cam member, said reciprocable member having a rotatable roller mounted thereon and abutting against the cam surface of said cam member so that reciprocation of said reciprocable member effects rotation of said cam member and thereby said shaft;
a link mechanism connected between said spindle and said reciprocable member for transmitting and multiplying a displacement of said spindle with respect to said body to effect an enlarged movement of said reciprocable member with respect to said shaft, said link mechanism being pivotally mounted at the end thereof adjacent to said spindle and the opposite end thereof being coupled to said reciprocable member, said link mechanism having a flat surface and said spindle having a driving piece connected thereto and engaging said flat surface so that movement of said spindle effects pivoting of said link mechanism.

2. A dial gauge as claimed in claim 1 including threaded coupling means connecting said driving piece to said spindle so that said driving piece is linearly movable in a direction perpendicular to the longitudinal axis of said spindle so that said driving piece can be moved along said flat surface to adjust the factor by which displacement of said spindle is multiplied to effect enlarged movement of said reciprocable member with respect to said shaft.

3. A dial gauge, comprising:
a gauge case body having a hollow stem projecting therefrom;
an elongated spindle protruding from said body and supported in said stem for axial displacement toward and away from said body, and a first spring in said stem urging said spindle in a direction outwardly from said body;
a shaft rotatably mounted within said body, an indicator hand mounted on one end of said shaft for rotation therewith, an involute cam member mounted on said shaft and adapted to effect rotation thereof, and second biasing means connected between said shaft and said body for urging said shaft and thereby said cam member and said indicator hand in one predetermined rotational direction;
a guide block affixed to said body, a reciprocable member slidably supported by said guide block for reciprocation toward and away from said cam member, said reciprocable member having a rotatable roller mounted thereon and abutting against the cam surface of said cam member so that reciprocation of said reciprocable member effects rotation of said cam member and thereby said shaft, said reciprocable member having a projection extending upwardly from its upper surface, and a second spring for urging said reciprocable member away from said cam member;
a link mechanism connected between said spindle and said reciprocable member for transmitting and multiplying a displacement of said spindle with respect to said body to effect an enlarged movement of said reciprocable member with respect to said shaft, said link mechanism being pivotally mounted at the end thereof adjacent to said spindle and the opposite end thereof abutting against said projection on said reciprocable member, said link mechanism having a flat surface, a driving piece having a sharp edge contacting said flat surface of said link mechanism, threaded coupling means connecting said driving piece to said spindle so that said driving piece is linearly movable in a direction perpendicular to the longitudinal axis of said spindle so that said driving piece can be moved along said flat surface whereby movement of said spindle effects pivoting of said link mechanism.

4. A dial gauge, comprising:
a substantially cylindrical gauge case body having a side wall, a closed bottom wall and an open top, said body having a substantially cylindrical stem projecting radially from said side wall;
a cover closing the open top of said body, said cover comprising a transparent cover plate and a dial plate;
a rotatable shaft mounted within said body, said shaft extending perpendicularly to said bottom wall of said body and projecting through said dial plate but not said cover plate, an indicator hand mounted on said shaft for rotation therewith and located between said dial plate and said cover plate, an involute cam mounted on said shaft for joint rotation therewith, and a first spring connected between said body and said shaft for urging said shaft and thereby said cam and said indicator hand in one predetermined rotational direction;
an elongated spindle extending through said stem and supported by said stem for radial movement with respect to said body, said spindle having an inner end extending into said body and having an outer end projecting from said stem for engaging a workpiece, and second spring means in said stem for urging said spindle outwardly from said stem;

a guide block mounted in said body, a slider mounted for reciprocating movement in said guide block in a direction that is substantially tangent to the peripheral surface of said cam, said slider having a rotatable roller on its inner end and rollingly engaging the peripheral surface of said cam so that inward movement of said slider effects rotation of said cam in a direction opposite to said one predetermined rotational direction, said slider having a projection extending therefrom in a direction perpendicular to the direction of movement of said slider;

a lever mounted adjacent to the outer end thereof for pivotal movement about an axis which extends perpendicular to said bottom wall, said lever extending crossways within said body and the inner end of said lever engaging said projection on said guide block so that pivoting of said lever effects reciprocation of said slider, said lever having a flat surface on the outer end thereof and offset laterally from said axis;

a screw threaded through the inner end of said spindle within said body and extending perpendicularly to the longitudinal axis of said spindle and parallel with the bottom wall of said body, a driving piece integral with and extending axially from said screw and having a V-shaped edge contacting said flat surface of said lever and being movable therealong in response to threading of said screw through said spindle whereby axial displacement of said spindle is effective to pivot said lever.

* * * * *